(12) United States Patent
Kamio et al.

(10) Patent No.: US 7,484,495 B2
(45) Date of Patent: Feb. 3, 2009

(54) HOMOGENEOUS CHARGE COMPRESSION IGNITION INTERNAL COMBUSTION ENGINE

(75) Inventors: Junichi Kamio, Wako (JP); Takuya Sato, Wako (JP); Yukihiko Kiyohiro, Wako (JP); Kohei Kuzuoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 11/635,619

(22) Filed: Dec. 8, 2006

(65) Prior Publication Data

US 2007/0163537 A1  Jul. 19, 2007

(30) Foreign Application Priority Data

Jan. 13, 2006  (JP)  ............... 2006-006632

(51) Int. Cl.
*F02M 43/00*  (2006.01)
*F02B 7/00*  (2006.01)
*F02B 13/00*  (2006.01)
*F02B 15/00*  (2006.01)

(52) U.S. Cl. ............... 123/304; 123/431; 123/432; 123/575

(58) Field of Classification Search ............... 123/299, 123/304, 305, 431, 432, 575, 1 A, 25 R
See application file for complete search history.

(56) References Cited

U.S. PATENT DOCUMENTS

| | | | |
|---|---|---|---|
| 6,550,430 B2 * | 4/2003 | Gray ............... | 123/27 GE |
| 6,684,852 B2 * | 2/2004 | Wright et al. ............... | 123/431 |
| 7,261,065 B2 * | 8/2007 | Aimoto et al. ............... | 123/3 |
| 7,284,506 B1 * | 10/2007 | Sun et al. ............... | 123/1 A |
| 7,290,505 B2 * | 11/2007 | Kamio et al. ............... | 123/1 A |
| 7,320,302 B2 * | 1/2008 | Kobayashi ............... | 123/299 |
| 2005/0155344 A1 * | 7/2005 | Kobayashi ............... | 60/286 |
| 2007/0028890 A1 * | 2/2007 | Brown et al. ............... | 123/299 |
| 2007/0039588 A1 * | 2/2007 | Kobayashi ............... | 123/304 |
| 2007/0219701 A1 * | 9/2007 | Hashimoto et al. ............... | 701/103 |

FOREIGN PATENT DOCUMENTS

JP  2000-179368 A  6/2000

* cited by examiner

*Primary Examiner*—Willis R. Wolfe, Jr.
*Assistant Examiner*—Johnny H. Hoang
(74) *Attorney, Agent, or Firm*—Birch, Stewart, Kolasch & Birch, LLP

(57) ABSTRACT

A homogeneous charge compression ignition internal combustion engine capable of reliably reducing flame noise at a time of high-load operation is provided. The engine includes an injector which injects a liquid hydrocarbon fuel to an intake port, and an injector which directly injects an alcohol fuel into a combustion chamber. The liquid hydrocarbon fuel is distributed to an outer peripheral side of the combustion chamber, and the alcohol fuel is distributed to a central portion. The engine includes two intake valves, and divides an intake stroke into a period in which one of the intake valves is stopped and a fuel-gas mixture is flown, and a period in which the both of the intake valves are operated and the flow is suppressed, guides the liquid hydrocarbon fuel into the combustion chamber during the flow period, and injects the alcohol fuel to the combustion chamber during the flow suppression period.

9 Claims, 5 Drawing Sheets

HOMOGENEOUS CHARGE COMPRESSION IGNITION INTERNAL COMBUSTION ENGINE

BACKGROUND OF THE INVENTION

1. Field of the Invention

The present invention relates to a homogeneous charge compression ignition internal combustion engine.

2. Description of the Related Art

In recent years, a homogeneous charge compression ignition internal combustion engine that introduces a gaseous mixture which is obtained by previously mixing oxygen-containing gas and a fuel which is self-ignitable by compression into a combustion chamber and compresses it, and thereby, causes the fuel to self-ignite has been studied. In the above described homogeneous charge compression ignition internal combustion engine, a lean gaseous mixture is compressed at a high compression ratio and is caused to self-ignite, and therefore, all the fuel that is supplied to the combustion chamber burns substantially at the same time. As a result, according to the above described homogeneous charge compression ignition internal combustion engine, the fuel consumption per predetermined time can be reduced, and the quantity of air pollutant in exhaust gas can be reduced. However, in the above described homogeneous charge compression ignition internal combustion engine, pressure abruptly rises due to premature ignition at the time of a high-load operation, and therefore, there is the problem of occurrence of extremely large flame noise.

There has been conventionally known a homogeneous charge compression ignition internal combustion engine in which a low-octane fuel is supplied to an intake port and a high-octane fuel is supplied to the combustion chamber in order to prevent flame noise due to the above described premature ignition. According to the above described conventional art, the layer of a gaseous mixture including the low-octane fuel is formed in the vicinity of the peripheral wall of the inside of the combustion chamber, and the layer of a gaseous mixture including the high-octane fuel is formed at the central portion in the combustion chamber. When the above described gaseous mixture is compressed, the self-ignition combustion starts at the low-octane fuel, and therefore, the self-ignition combustion advances from the area in the vicinity of the peripheral wall of the inside of the above described combustion chamber to the central portion. As a result, the combustion period can be prolonged, and occurrence of flame noise can be reduced (see Japanese Patent Laid-Open No. 2000-179368).

However, the premixed mixture compression ignition internal combustion engine in which the low-octane fuel is supplied to the intake port and the high-octane fuel is supplied into the combustion chamber has the disadvantage of being incapable of obtaining the effect of reducing the occurrence of the above described flame noise depending on the kind of the high-octane fuel.

SUMMARY OF THE INVENTION

The present invention has an object to provide a homogeneous charge compression ignition internal combustion engine capable of eliminating the above disadvantage and reliably reducing the occurrence of extremely large flame noise at the time of a high-load operation.

In order to attain the above-described object, the present invention provides a homogeneous charge compression ignition internal combustion engine comprising an intake port guiding a gaseous mixture into a combustion chamber, a first injector injecting a first fuel to the intake port, and a second injector directly injecting a second fuel into the combustion chamber, and the engine compresses a gaseous mixture including the fuels supplied from both of the injectors to cause the same to self-ignite, wherein the first fuel is a liquid hydrocarbon fuel, and the second fuel is an alcohol fuel.

Generally, in the case of using only the above described liquid hydrocarbon fuel as the fuel, when the fuel-gas mixture including the liquid hydrocarbon fuel is compressed, the liquid hydrocarbon fuel causes low temperature oxidation reaction first, and by heat generation of the low temperature oxidation reaction, the liquid hydrocarbon fuel self-ignites in all over the above described fuel combustion chamber substantially at the same time. With self-ignition of the above described liquid hydrocarbon fuel based on such a mechanism, premature ignition occurs at the time of a high-load operation, and flame noise cannot be reduced.

However, in the homogeneous charge compression ignition internal combustion engine of the present invention, the above described liquid hydrocarbon fuel which is injected from the above described first injector is guided into the above described combustion chamber from the above described intake port, while the above described alcohol fuel is directly injected into the above described combustion chamber from the above described second injector. Thus, if the above described fuel-gas mixture is compressed, the above described liquid hydrocarbon fuel causes low temperature oxidation reaction first as described above.

However, the above described alcohol fuel has the action to suppress heat generation by the above described low temperature oxidation reaction, and therefore, in the region where the alcohol fuel is injected in the above described combustion chamber, heat generation by the low temperature oxidation reaction is reduced. Therefore, in the previous stage of the compression self-ignition of the above described fuel-gas mixture, in the above described combustion chamber, the temperature distribution is formed such that the temperature is high at the region where the above described liquid hydrocarbon fuel is guided, and the temperature becomes lower toward the region where the above described alcohol fuel is injected.

As a result, self-ignition of the above described fuel-gas mixture does not occur in all over the above described combustion chamber substantially at the same time, but, it first occurs in the region where the above described liquid hydrocarbon fuel is guided, and then it sequentially moves to the region where the above described alcohol fuel is injected. Therefore, with self-ignition of the above described fuel-gas mixture, the combustion period is prolonged, pressure increase is alleviated, and occurrence of flame noise can be suppressed.

The action to suppress heat generation by the above described low temperature oxidation reaction is not the action which can be obtained from any fuel so long as it is a high-octane fuel, but is the action peculiar to the above described alcohol fuel. As the above described alcohol fuel, for example, ethanol can be used.

In the homogeneous charge compression ignition internal combustion engine of the present invention, it is preferable that the gaseous mixture including the liquid hydrocarbon fuel guided from the above described intake port is distributed to an outer peripheral side in the above described combustion chamber, and the above described alcohol fuel injected from the above described second injector is distributed to a central portion in the combustion chamber, in order to prolong the combustion period as described above.

According to the above, the fuel-gas mixture in which the above described liquid hydrocarbon fuel is distributed to the outer peripheral side in the above described combustion chamber, and the above described alcohol fuel is distributed to the central portion in the above described combustion chamber is formed. As a result, the low temperature oxidation reaction of the above described liquid hydrocarbon fuel occurs, and in the stage before compression self-ignition of the above described fuel-gas mixture occurs, the temperature is high at the outer peripheral side in the above described combustion chamber, and the temperature becomes lower continuously and relatively toward the central portion. Thus, self-ignition of the above described fuel-gas mixture starts at the outer peripheral side in the combustion chamber first, and sequentially moves to the central portion.

Accordingly, the combustion period is further prolonged, pressure increase is further alleviated, and occurrence of flame noise can be effectively suppressed.

Further, the homogeneous charge compression ignition internal combustion engine of the present invention preferably includes a plurality of intake valves, and it is preferable that an intake stroke is divided into a period in which any one of the intake valves is stopped, and the above described fuel-gas mixture guided into the above described combustion chamber flows inside the combustion chamber, and a period in which all the intake valves are operated, and flow of the fuel-gas mixture is suppressed, and in the period in which the fuel-gas mixture flows, a gaseous mixture including the above described liquid hydrocarbon fuel is guided into the combustion chamber from the above described intake port, while in the period in which the flow of the fuel-gas mixture is suppressed, the above described alcohol fuel is injected into the combustion chamber from the above described second injector.

With the above described construction, the homogeneous charge compression ignition internal combustion engine of the present invention can easily distribute the gaseous mixture including the liquid hydrocarbon fuel guided from the above described intake port to the outer peripheral side in the above described combustion chamber. With the above described construction, the homogeneous charge compression ignition internal combustion engine of the present invention can easily distribute the above described alcohol fuel injected from the above described second injector to the central portion in the combustion chamber.

The above described plurality of intake valves can be constructed by, for example, a first intake valve connected to the first intake port which guides the gaseous mixture to the inner peripheral side in the above described combustion chamber, and a second intake valve connected to the second intake port which guides the gaseous mixture to the outer peripheral side in the above described combustion chamber. According to such a construction, by stopping the first intake valve and operating only the second intake valve, the above described fuel-gas mixture is flown in the combustion chamber by the gaseous mixture guided to the outer peripheral side in the above described combustion chamber from the second intake port. Thus, by guiding the gaseous mixture including the above described liquid hydrocarbon fuel into the above described combustion chamber in such condition, the liquid hydrocarbon fuel can be easily distributed to the outer peripheral side in the combustion chamber.

Meanwhile, when both the first intake valve and the second intake vale are operated, flow of the above described fuel-gas mixture is suppressed. Thus, by injecting the above described alcohol fuel into the above described combustion chamber in such condition, the above described alcohol fuel can be easily distributed to the central portion in the combustion chamber.

The homogeneous charge compression ignition internal combustion engine of the present invention may store the above described liquid hydrocarbon fuel and the above described alcohol fuel in separate fuel tanks, but is preferably provided with separating means for separating a composite fuel composed of liquid hydrocarbon and alcohol into an alcohol-water mixture solution in which the water and the alcohol are mixed and the liquid hydrocarbon by mixing water thereinto, first supplying means for supplying the liquid hydrocarbon separated in the separating means to the above described first injector, and second supplying means for supplying the alcohol-water mixture solution separated in the separating means to the above described second injector.

By including such a construction, the homogeneous charge compression ignition internal combustion engine of the present invention can obtain the above described liquid hydrocarbon and the above described alcohol-water mixture solution from the single fuel that is the above described composite fuel, and can use the liquid hydrocarbon as the above described liquid hydrocarbon fuel, and can use the alcohol-water mixture solution as the above described alcohol fuel. Accordingly, it is not necessary to store the above described liquid hydrocarbon fuel and the above described alcohol fuel in the separate fuel tanks, but only the single fuel that is the above described composite fuel has to be stored in the single fuel tank, and therefore, the apparatus configuration can be simplified.

DETAILED DESCRIPTION OF THE PREFERRED EMBODIMENTS

Next, an embodiment of the present invention will be described in more detail with reference to the attached drawings.

Figure 1:
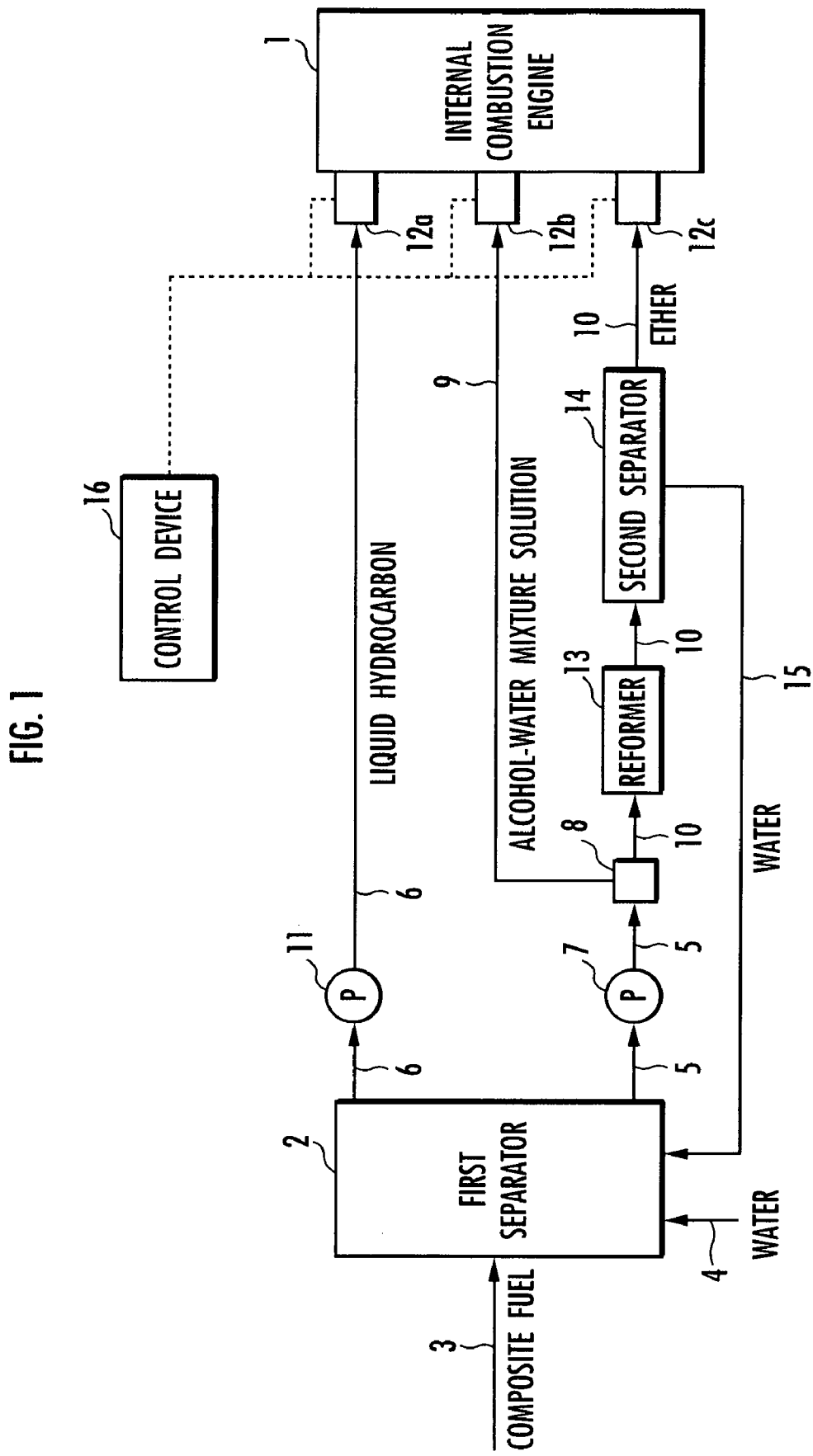
FIG. 1 is a system block diagram showing one configuration example of an internal combustion engine system including a homogeneous charge compression ignition internal combustion engine of the present invention.

As shown in FIG. 1, an internal combustion engine system of this embodiment includes a premixed mixture compression ignition internal combustion engine 1, and a first separator 2 which mixes water into a composite fuel composed of a liquid hydrocarbon and alcohol and separates it into an alcohol-water mixture solution and the liquid hydrocarbon. The first separator 2 includes a first conduit 3 which introduces the above described composite fuel from a fuel tank not shown, and a first water conduit 4 which introduces water to be mixed into the composite fuel, and also includes a second conduit 5 which takes out the separated alcohol-water mixture solution, and a third conduit 6 which takes out the separated liquid hydrocarbon.

The second conduit 5 is connected to a dispensing device 8 via a pump 7, and a fourth conduit 9 and a fifth conduit 10 diverge from the dispensing device 8. The third conduit 6 is connected to a first injector 12a provided at the homogeneous charge compression ignition internal combustion engine 1 via a pump 11, and the above described liquid hydrocarbon separated in the first separator 2 is supplied to the first injector 12a though the third conduit 6.

The fourth conduit 9 diverging from the dispensing device 8 is connected to a second injector 12b provided at the homogeneous charge compression ignition internal combustion engine 1, and the above described alcohol-water mixture solution separated in the first separator 2 is supplied to the second injector 12b through the second conduit 5 and the fourth conduit 9.

The fifth conduit 10 is connected to a third injector 12c provided at the homogeneous charge compression ignition internal combustion engine 1 through a reformer 13 and a second separator 14 provided on its route to the third injector 12c. The reformer 13 causes a catalyst to act on the alcohol-water mixture solution supplied through the fifth conduit 10 to reform it into an ether-water mixture solution, and the second separator 14 separates the ether-water mixture solution supplied from the reformer 13 into ether and water. Ether separated in the second separator 14 is supplied to the third injector 12c through the fifth conduit 10. Meanwhile, the second separator 13 includes a second conduit 15 connected to the first separator 2, and the water separated in the second separator 14 is caused to flow back to the first separator 2 through the second water conduit 15.

Further, the internal combustion engine system of this embodiment includes a control device 16 which controls a jet quantity of each of the injectors 12a, 12b and 12c.

Next, an operation of the internal combustion engine system of this embodiment will be described.

In the internal combustion engine system of this embodiment, a composite fuel composed of liquid hydrocarbon and alcohol is first introduced into the first separator 2 through the first conduit 3 from a fuel tank not shown. As the above described liquid hydrocarbon, for example, gasoline, naphtha and the like can be sited, and as the above described alcohol, for example, ethanol and the like can be cited. The above described composite fuel is mixed with the water introduced from the first conduit 4 and the second conduit 15 inside the first separator 2.

Here, the above described alcohol such as ethanol includes solubility in water, but the liquid hydrocarbon such as gasoline and naphtha is insoluble in water. Therefore, if water is mixed into the above described composite fuel, the above described alcohol mixes with the water to form an alcohol-water mixture solution, while the above described liquid hydrocarbon easily separates from the alcohol-water mixture solution.

The above described alcohol-water mixture solution and the above described liquid hydrocarbon differ in specific gravity, and when for example, the hydrocarbon is gasoline, naphtha or the like, the alcohol-water mixture solution including water is larger in specific gravity. Accordingly, the above described alcohol-water mixture solution and the above described liquid hydrocarbon separates into two upper and lower layers by the action of the gravity inside the first separator 2, and the alcohol-water mixture solution is formed on the lower layer while the liquid hydrocarbon is formed on the upper layer. Thus, in the first separator 2, the second conduit 5 is connected to a bottom portion to take out the above described alcohol-water mixture solution, and the third conduit 6 is connected to a top portion to take out the above described liquid hydrocarbon.

Next, the above described liquid hydrocarbon separated in the first separator 2 is supplied to the first injector 12a through the third conduit 6. The above described alcohol-water mixture solution separated in the first separator 2 is fed to the dispensing device 8 through the second conduit 5. The dispensing device 8 distributes predetermined quantities of the above described alcohol-water mixture solution supplied through the second conduit 5 to the fourth conduit 9 and the fifth conduit 10, respectively. Then, the above described alcohol-water mixture solution 21 which is distributed to the fourth conduit 9 by the dispensing device 8 is supplied to the second injector 12b through the fourth conduit 9.

Meanwhile, the above described alcohol-water mixture solution which is distributed to the fifth conduit 10 by the dispensing device 8 is then supplied to the reformer 13, and in the reformer 13, the action of the catalyst causes dehydration condensation to alcohol to generate ether corresponding to the alcohol. As a result, the above described alcohol-water mixture solution is reformed into an ether-water mixture solution.

Next, the above described ether-water mixture solution is fed to the second separator 14 through the fifth conduit 10. Here, the above described ether and water are insoluble in each other, and differ in specific gravity. Therefore, the above described ether and water easily separate into the upper and lower two layers by the action of the gravity inside the second separator 14, and the above described ether which is separated is supplied to the third injector 12c through the fifth conduit 10. The water separated in the second separator 14 is flown back to the first separator 2 through the second water conduit 15.

In the internal combustion engine system of this embodiment, the above described liquid hydrocarbon, alcohol-water mixture solution and ether separated as described above are supplied as a fuel to the homogeneous charge compression ignition internal combustion engine 1 from the respective injectors 12a, 12b and 12c. At this time, the control device 16 grasps the operation state of the homogeneous charge compression ignition internal combustion engine 1 and controls the quantities of the above described liquid hydrocarbon, alcohol-water mixture solution and ether which are injected from the respective injectors 12a, 12b and 12c. More specifically, the control device 16 increases the ratio of the above described alcohol-water mixture solution with respect to the total fuel as the required load becomes higher, and increases the ratio of the above described ether with respect to the total fuel as the required load becomes lower.

Figure 2:
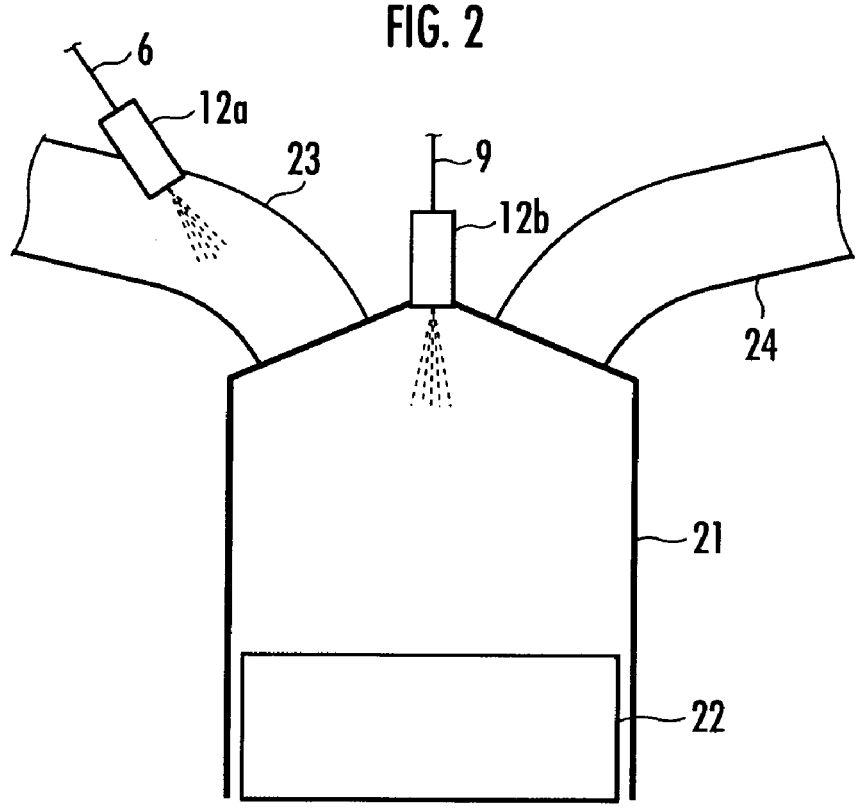
FIG. 2 is an explanatory sectional view showing one configuration example of the homogeneous charge compression ignition internal combustion engine of the present invention.

As shown in FIG. 2, the homogeneous charge compression ignition internal combustion engine 1 includes a piston 22 in a cylinder 21 which acts as the combustion chamber, and an intake port 23 and an exhaust port 24 which communicate with the cylinder 21. In the homogeneous charge compression ignition internal combustion engine 1, the injector 12a is provided at the intake port 23 and the injector 12b is provided at the cylinder 21 in order to reduce occurrence of flame noise when the required load becomes high.

Figure 3:
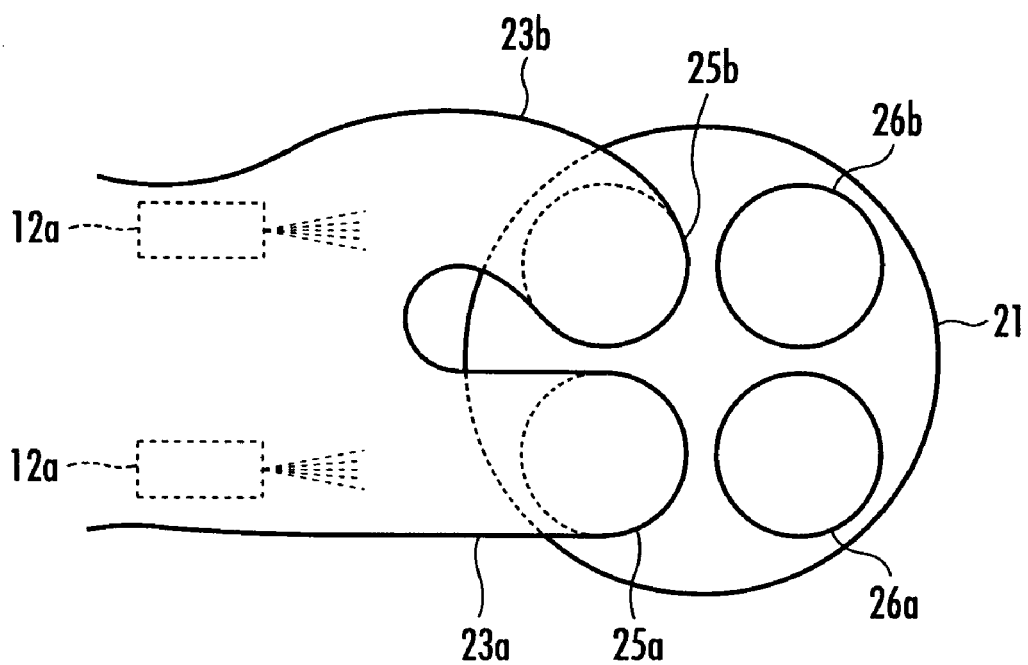
FIG. 3 is a plan view showing one configuration example of the homogeneous charge compression ignition internal combustion engine of the present invention.

As shown in FIG. 3, the intake port 23 is branched into two at its tip end portion to form an intake port 23a which is connected to an intake valve 25a and an intake port 23b which is connected to an intake valve 25b. The intake ports 23a and 23b are respectively provided with the injectors 12a. The cylinder 21 includes exhaust valves 26a and 26b as well as the intake valve 25a and the intake valve 25b, and the exhaust valves 26a and 26b are connected to the exhaust port 24 shown in FIG. 2.

The intake ports 23a and 23b both may be of straight types, but the intake port 23a at one side may be of a straight type and the intake port 23b at the other side may be of a swirl type as shown in FIG. 3. With this structure, the fuel-gas mixture which is supplied from the straight type intake port 23a is rectilinearly supplied to the inner peripheral side in the cylinder 21, but the fuel-gas mixture which is supplied from the swirl type intake port 23b is introduced into the cylinder 21 while curvilinearly swirling, and is supplied to the outer peripheral side in the cylinder 21 by its centrifugal force.

When the intake valve 25a is stopped and only the intake valve 25b is operated, flow of the fuel-gas mixture in the cylinder is formed by the fuel-gas mixture which is supplied from the swirl type intake port 23b. The above described flow in the cylinder is suppressed by operating both of the intake valves 25a and 25b.

Next, an operation of the homogeneous charge compression ignition internal combustion engine 1 of this embodiment will be described.

When the required load is high, namely, at the time of high-load operation in the homogeneous charge compression ignition internal combustion engine 1 of this embodiment, the above described liquid hydrocarbon which is supplied through the third conduit 6 is injected to the intake port 23 from the injector 12a, and then, the above described alcohol-water mixture solution which is supplied through the fourth conduit 9 is directly injected into the cylinder 21 from the injector 12b.

Figure 4:
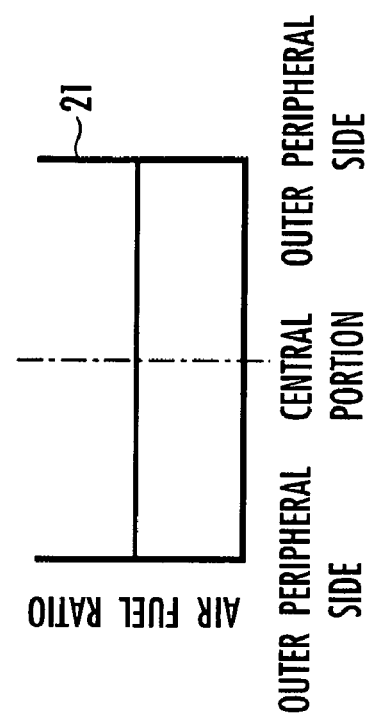
FIGS. 4A to 4D and 5A to 5D are graphs showing distributions of heat generation of low temperature oxidation reaction and an air fuel ratio in the homogeneous charge compression ignition internal combustion engine of the present invention.
Figure 4:
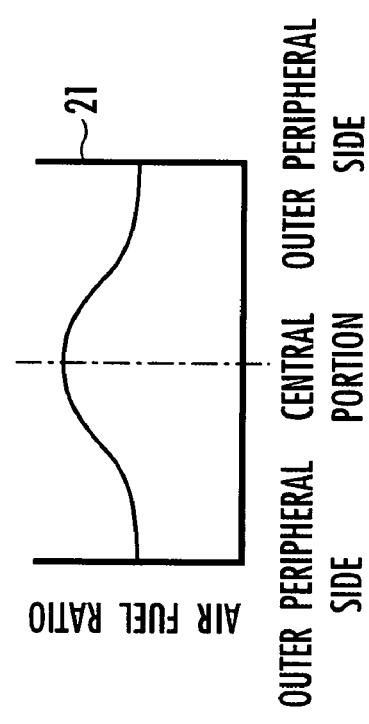
Figure 4:
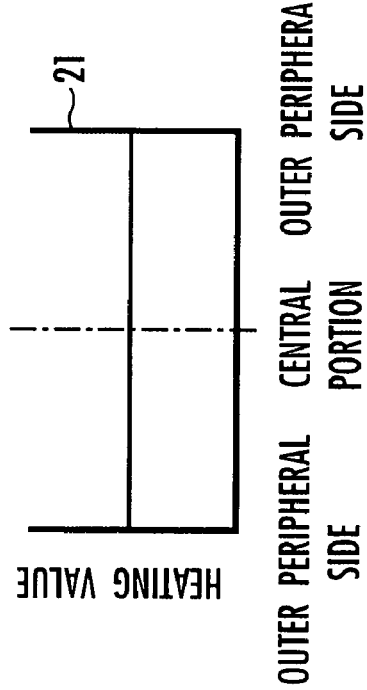
Figure 4:
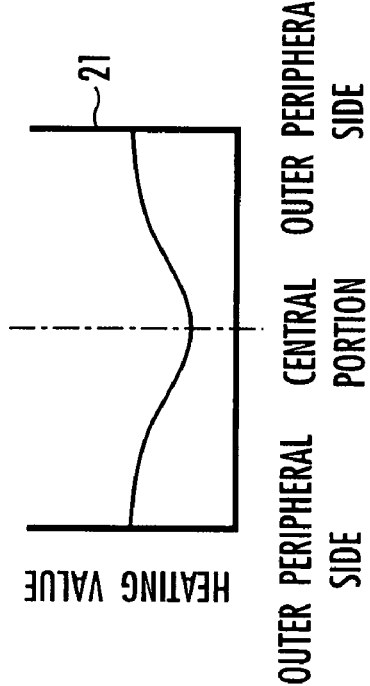

When both the intake ports 23a and 23b are of straight types at this time, the above described liquid hydrocarbon is injected from the injector 12a first, and thereby, the distributions of the heating value of low temperature oxidation reaction in the cylinder 21 and air-fuel ratio are both uniform as shown in FIGS. 4A and 4B. Next, when the above described alcohol-water mixture solution is directly injected into the cylinder 21 from the injector 12b, the distribution of the heating value of the low temperature oxidation reaction in the cylinder 21 becomes lower toward the central portion as shown in FIG. 4C, since the above described alcohol has the action to suppress heat generation by the above described low temperature oxidation reaction. The distribution of the air-fuel ratio in the cylinder 21 becomes higher toward the central portion as shown in FIG. 4D.

When the intake port 23a is of the straight type, and the intake port 23b is of the swirl type, the intake stroke is divided into the period in which the above described liquid hydrocarbon is injected from the injector 12a with the intake valve 25a stopped and only the intake valve 25b operated, and the fuel-gas mixture flows in the cylinder 21, and the period in which the above described liquid hydrocarbon is injected from the injector 12a with both the intake valves 25a and 25b operated, and the flow in the cylinder is suppressed. Then, in the state in which the above described flow in the cylinder is suppressed, the above described alcohol-water mixture solution is directly injected into the cylinder 21 from the injector 12b.

Figure 5:
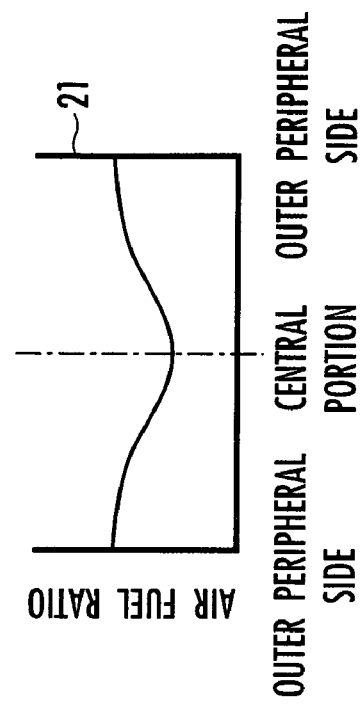
Figure 5:
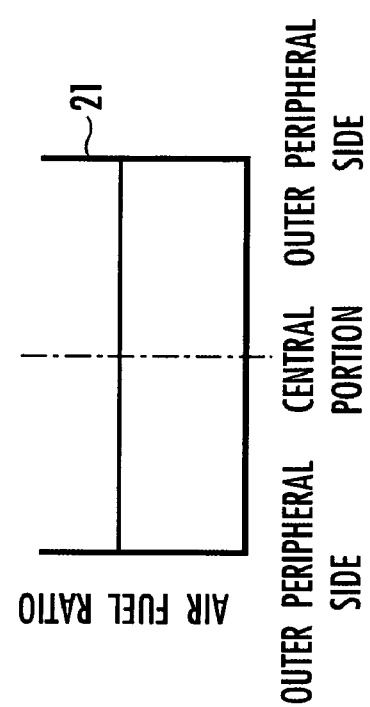
Figure 5:
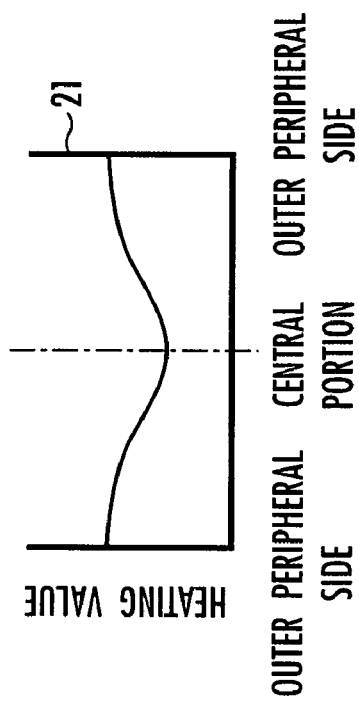
Figure 5:
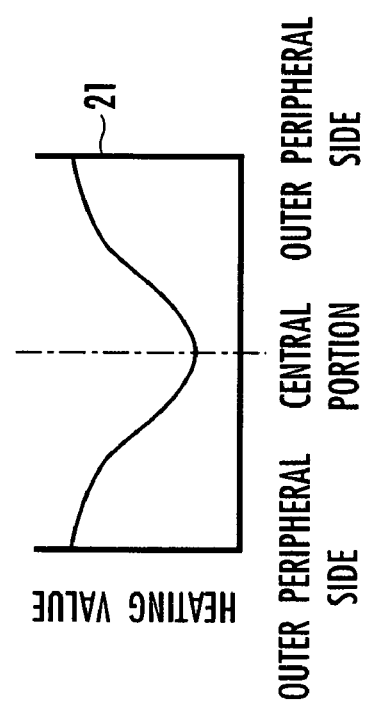

In the above described case, when the above described liquid hydrocarbon is injected from the injector 12a with the intake valve 25a stopped and only the intake valve 25b operated, the flow of the fuel-gas mixture is formed inside the cylinder 21. As a result, the distributions of the heating value of the low temperature oxidation reaction in the cylinder 21 and the air-fuel ratio both become lower toward the central portion as shown in FIGS. 5A and 5B.

Next, the above described liquid hydrocarbon is injected from the injector 12a with both the intake valves 25a and 25b operated, and in the state in which the flow in the cylinder is suppressed, the above described alcohol-water mixture solution is directly injected into the cylinder 21 from the injector 12b. Thereby, the distribution of the heating value of the low temperature oxidation reaction in the cylinder 21 shows the stronger tendency to be lower toward the central portion as shown in FIG. 5C, since the above described alcohol has the action to suppress heat generation by the above described low temperature oxidation reaction. The distribution of the air-fuel ratio in the cylinder 21 becomes higher toward the central portion relative to the state in FIG. 5B, and is made relatively uniform as shown in FIG. 5D.

After the above described liquid hydrocarbon is injected, and then the above described alcohol-water mixture solution is injected, the fuel-gas mixture in the cylinder 21 is compressed by the piston 22 and is self-ignited in the homogeneous charge compression ignition internal combustion engine 1 of this embodiment. The change in the heating value with respect to the crank angle at this time is shown in FIG. 6A, and the change in pressure in the cylinder with respect to the crank angle is shown in FIG. 6B respectively as examples.

Figure 6:
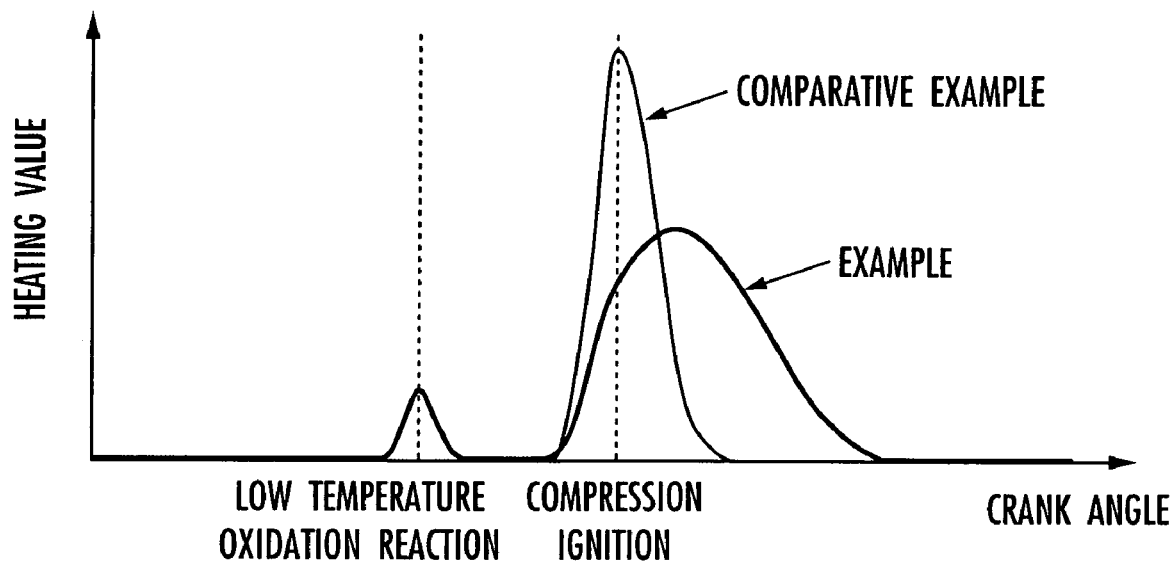
FIGS. 6A and 6B are graphs showing the relationship between a crank angle, and heat generation of the low temperature oxidation reaction and pressure in the homogeneous charge compression ignition internal combustion engine of the present invention.
Figure 6:
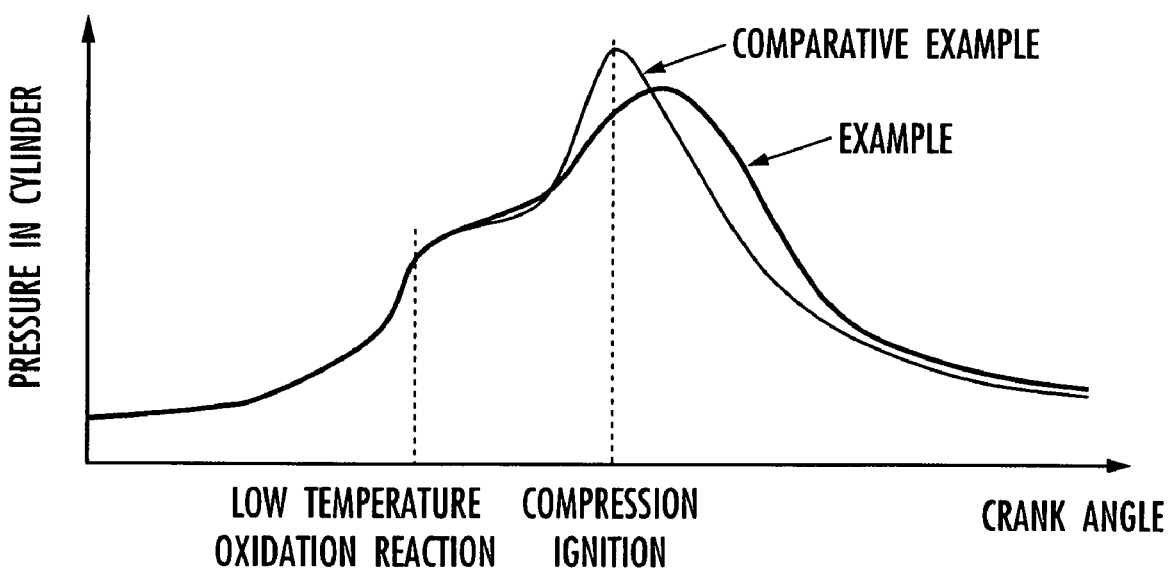

The change in heating value with respect to the crank angle when the fuel-gas mixture in the cylinder 21 is compressed by the piston 22 and self-ignited after only the above described liquid hydrocarbon is injected is shown in FIG. 6A, and the change in the pressure in the cylinder with respect to the crank angle is shown in FIG. 6B respectively as comparative examples.

As shown in FIG. 6A, when only the above described liquid hydrocarbon is injected in the comparative example, low temperature oxidation reaction first occurs, and by the heat generation, compression ignition occurs in the entire area in the cylinder 21 substantially at the same time. As a result, the heating value at the time of compression ignition is very large, and with this, the pressure inside the cylinder abruptly rises as shown in FIG. 6B.

On the other hand, in the case of this embodiment (example), it is obvious that the period of self-ignition of the above described fuel-gas mixture is prolonged as shown in FIG. 6A, and it is also obvious that rise in the pressure in the cylinder is alleviated as shown in FIG. 6B.

This is considered to be due to the fact that the heating value becomes large in the outer peripheral side in the cylinder 21 and the heating value becomes continuously and relatively smaller toward the central portion by the action of the alcohol to suppress heat generation by the above described low temperature oxidation reaction after the above described low temperature oxidation reaction as shown in FIG. 4C or FIG. 5C. It is conceivable that when the heating value becomes large in the outer peripheral side in the cylinder 21 and the heating value continuously and relatively becomes smaller toward the central portion after the above described low temperature oxidation reaction like this, self-ignition of the above described fuel-gas mixture starts in the outer peripheral side of the cylinder 21 first, and sequentially moves to the central portion, thus prolonging the combustion period by compression self-ignition, alleviating rise in the pressure in the cylinder, and making it possible to effectively suppress the occurrence of flame noise.

In the composite fuel used in this embodiment, use of ethanol is preferable as the above described alcohol. The above described ethanol can be obtained from fermentation and distillation of vegetable materials, for example, agricultural products such as sugar cane and corn, and in the vegetable materials, the plants themselves that are raw materials have already absorbed carbon dioxide. Therefore, even if ethanol obtained from the above described vegetable materials is burnt, the quantity of exhausted carbon dioxide is equal to the quantity of the carbon dioxide absorbed by the above described plants themselves. Namely, a so-called carbon neutral effect that the exhaust quantity of carbon dioxide in total becomes theoretically zero can be obtained, and the exhaust quantity of carbon dioxide is reduced, thus making it possible to contribute to prevention of global warming.

What is claimed is:

1. A homogeneous charge compression ignition internal combustion engine comprising an intake port guiding a gaseous mixture into a combustion chamber, a first injector injecting a first fuel to the intake port, and a second injector directly injecting a second fuel into the combustion chamber, the engine compresses a fuel-gas mixture including the fuels supplied from both of the injectors to cause the same to self-ignite, wherein the first fuel is a liquid hydrocarbon fuel, and the second fuel is an alcohol fuel.

2. The homogeneous charge compression ignition internal combustion engine according to claim 1, wherein the gaseous mixture including the liquid hydrocarbon fuel guided from said intake port is distributed to an outer peripheral side in said combustion chamber, and said alcohol fuel injected from said second injector is distributed to a central portion in the combustion chamber.

3. The homogeneous charge compression ignition internal combustion engine according to claim 2, further comprising:

a plurality of intake valves, wherein an intake stroke is divided into a period in which any one of the intake valves is stopped, and said fuel-gas mixture guided into said combustion chamber flows inside the combustion chamber, and a period in which all the intake valves arc operated, and flow of the fuel-gas mixture is suppressed, and wherein in the period in which the fuel-gas mixture flows, a gaseous mixture including said liquid hydrocarbon fuel is guided into the combustion chamber from said intake port, and in the period in which the flow of the fuel-gas mixture is suppressed, said alcohol fuel is injected into the combustion chamber from said second injector.

4. The homogeneous charge compression ignition internal combustion engine according to claim 3, wherein said intake ports are constituted of only straight type intake ports.

5. The homogeneous charge compression ignition internal combustion engine according to claim 3, wherein said intake ports are constituted of the straight type intake port and a swirl type intake port.

6. The homogeneous charge compression ignition internal combustion engine according to claim 1, further comprising:

separating means for separating a composite fuel composed of liquid hydrocarbon and alcohol into an alcohol-water mixture solution in which the water and the alcohol are mixed and the liquid hydrocarbon by mixing water thereinto;

first supplying means for supplying the liquid hydrocarbon separated in the separating means to said first injector; and second supplying means for supplying the alcohol-water mixture solution separated in the separating means to said second injector.

7. The homogeneous charge compression ignition internal combustion engine according to claim 1, wherein said liquid hydrocarbon fuel is gasoline.

8. The homogeneous charge compression ignition internal combustion engine according to claim 1, wherein said liquid hydrocarbon fuel is naphtha.

9. The homogeneous charge compression ignition internal combustion engine according to claim 1, wherein said alcohol fuel is ethanol.

* * * * *